United States Patent
Aymeloglu et al.

(10) Patent No.: US 8,036,971 B2
(45) Date of Patent: Oct. 11, 2011

(54) GENERATING DYNAMIC DATE SETS THAT REPRESENT MARKET CONDITIONS

(75) Inventors: Andrew Aymeloglu, Palo Alto, CA (US); Garry Tan, Mountain View, CA (US); Kevin Simler, Fremont, CA (US); Nick Miyake, Stanford, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 623 days.

(21) Appl. No.: 11/731,534

(22) Filed: Mar. 30, 2007

(65) Prior Publication Data

US 2008/0243711 A1   Oct. 2, 2008

(51) Int. Cl.
*G06Q 40/00* (2006.01)
(52) U.S. Cl. .................................................. 705/36 R
(58) Field of Classification Search .................. 705/35, 705/36 R
See application file for complete search history.

(56) References Cited

U.S. PATENT DOCUMENTS

| | | | | |
|---|---|---|---|---|
| 5,412,769 A * | 5/1995 | Maruoka et al. | ............. | 345/440 |
| 5,454,104 A * | 9/1995 | Steidlmayer et al. | ............. | 707/4 |
| 6,189,005 B1 * | 2/2001 | Chakrabarti et al. | ............. | 707/6 |
| 6,496,817 B1 * | 12/2002 | Whang et al. | ............. | 707/2 |
| 6,801,201 B2 * | 10/2004 | Escher | ............. | 705/36 R |
| 6,876,981 B1 * | 4/2005 | Berckmans | ............. | 705/35 |
| 6,907,426 B2 * | 6/2005 | Hellerstein et al. | ............. | 707/6 |
| 6,920,453 B2 * | 7/2005 | Mannila et al. | ............. | 707/6 |
| 7,185,065 B1 * | 2/2007 | Holtzman et al. | ............. | 709/217 |
| 7,401,038 B2 * | 7/2008 | Masuda | ............. | 705/35 |
| 7,403,921 B2 * | 7/2008 | Tanpoco et al. | ............. | 705/37 |
| 7,403,922 B1 * | 7/2008 | Lewis et al. | ............. | 705/38 |
| 7,469,238 B2 * | 12/2008 | Satchwell | ............. | 706/45 |
| 7,835,966 B2 * | 11/2010 | Satchwell | ............. | 705/36 R |
| 7,848,995 B2 * | 12/2010 | Dalal | ............. | 705/37 |
| 2002/0026404 A1 * | 2/2002 | Thompson | ............. | 705/37 |
| 2003/0078827 A1 | 4/2003 | Hoffman | | |
| 2003/0130996 A1 * | 7/2003 | Bayerl et al. | ............. | 707/3 |
| 2003/0139957 A1 * | 7/2003 | Satchwell | ............. | 705/7 |
| 2004/0133500 A1 * | 7/2004 | Thompson et al. | ............. | 705/37 |
| 2005/0075966 A1 * | 4/2005 | Duka | ............. | 705/37 |
| 2005/0090911 A1 | 4/2005 | Ingargiola et al. | | |
| 2005/0171881 A1 * | 8/2005 | Ghassemieh et al. | ............. | 705/35 |
| 2005/0256703 A1 * | 11/2005 | Markel | ............. | 704/223 |
| 2005/0262004 A1 * | 11/2005 | Sakata et al. | ............. | 705/37 |
| 2005/0262057 A1 * | 11/2005 | Lesh et al. | ............. | 707/3 |
| 2006/0224356 A1 * | 10/2006 | Castelli et al. | ............. | 702/176 |
| 2006/0235786 A1 * | 10/2006 | DiSalvo | ............. | 705/37 |
| 2006/0265311 A1 * | 11/2006 | Dean et al. | ............. | 705/37 |

(Continued)

FOREIGN PATENT DOCUMENTS

WO PCT/US2008/056439   6/2009

*Primary Examiner* — Jagdish Patel
*Assistant Examiner* — Kenneth Bartley
(74) *Attorney, Agent, or Firm* — Hickman Palermo Truong & Becker LLP

(57) ABSTRACT

In one embodiment, first input that specifies a market instrument is received. Second input that specifies one or more parameters for one or more date set computers associated with the market instrument is received. A first time series is received from a data repository, where the first time series is a sequence of data values associated with the market instrument. A set of time periods is extracted by applying the one or more date set computers based on the one or more parameters and the first time series. The set of time periods is displayed overlaid on a graphical representation of the first time series in a graphical user interface.

32 Claims, 8 Drawing Sheets

U.S. PATENT DOCUMENTS

| | | | | |
|---|---|---|---|---|
| 2007/0067233 | A1* | 3/2007 | Dalal | 705/37 |
| 2007/0168269 | A1* | 7/2007 | Chuo | 705/36 R |
| 2008/0040250 | A1* | 2/2008 | Salter | 705/36 R |
| 2008/0183639 | A1* | 7/2008 | DiSalvo | 705/36 R |
| 2008/0208820 | A1* | 8/2008 | Usey et al. | 707/3 |

\* cited by examiner

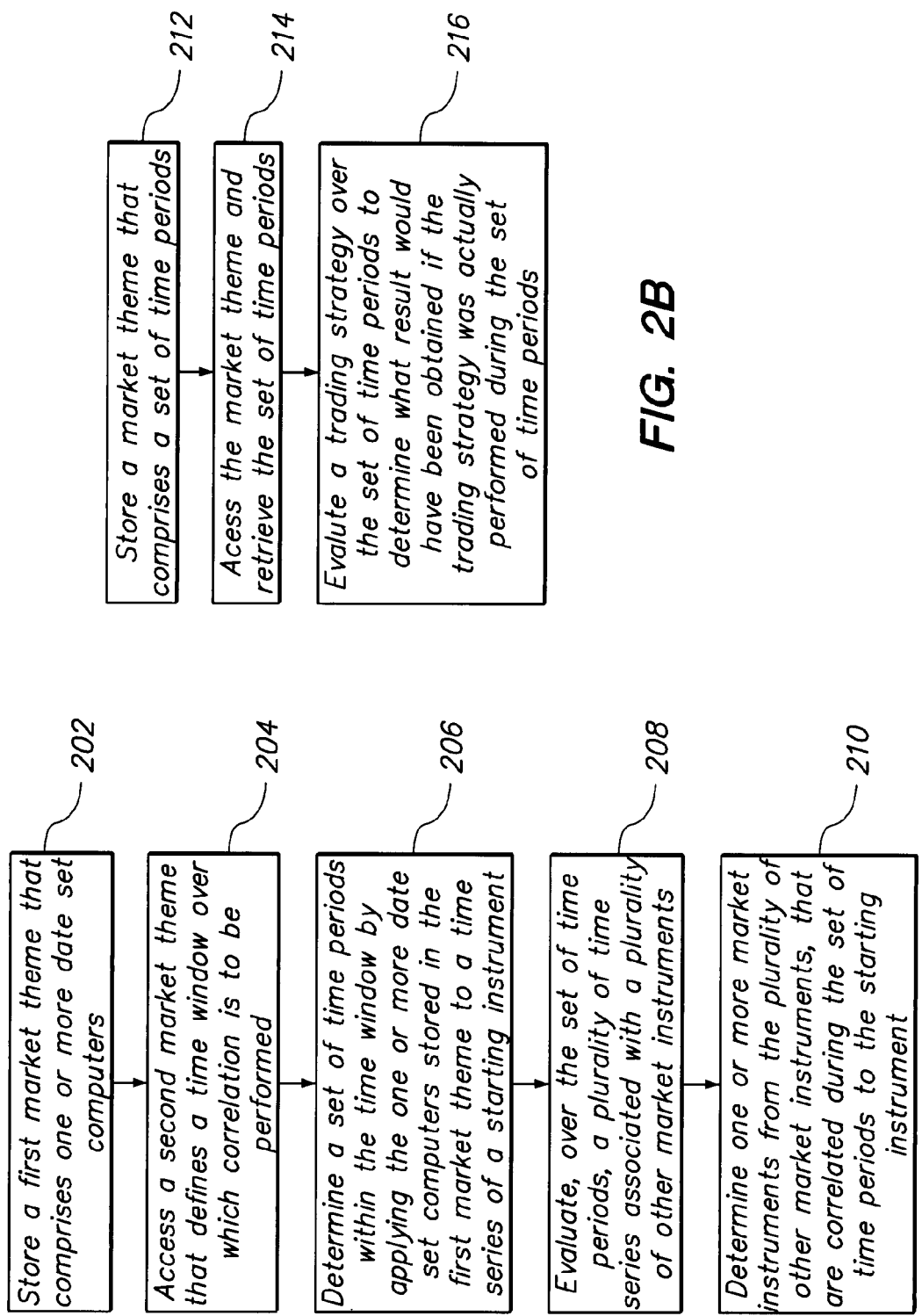

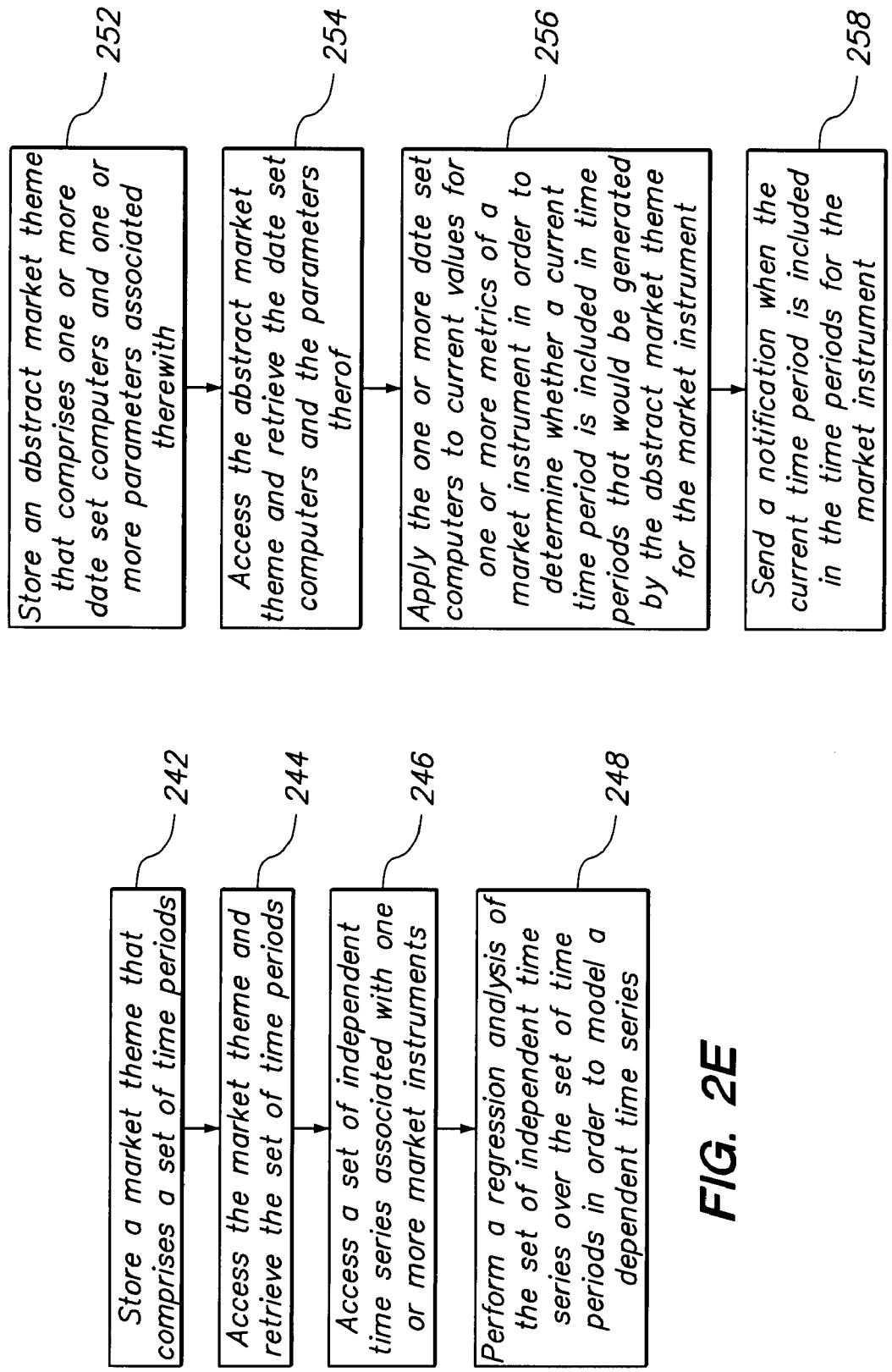

GENERATING DYNAMIC DATE SETS THAT REPRESENT MARKET CONDITIONS

FIELD OF THE INVENTION

The present disclosure generally relates to techniques for analyzing financial market conditions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally, the financial community has been interested in specific asset classes or economy sectors which have well defined characteristics and whose relationships to other asset classes and sectors are well known. Examples of specific asset classes with well-defined characteristics are stocks and bonds, which have relationships that are well known and widely used. Thus, the analysis tools presently used in the financial community are usually custom-made to perform specific analytical tasks based on well-known asset characteristics and relationships.

However, the financial community is becoming more and more interested in finding relationships and performing analysis across a wider variety of asset classes, economy sectors, countries, and markets. For example, with the rise of hedge funds this type of wider analysis is very useful in determining trading hypotheses that can be back-tested and used to determine the financial risks involved in particular trading strategies or other types of market exposure. While the data for different assets and economy sectors provided by stock markets and exchanges is becoming more and more accessible, the currently available analysis tools are not capable of performing accurate analysis over large data sets that involve wide variety of asset classes and other categories of interest.

The currently available analysis tools (for example, spreadsheet applications) are inadequate in allowing non-technical users to handle complex and technically challenging analysis of data sets that involve a large number of asset classes. Further, the currently available analysis tools are poorly suited to enabling different users to collaborate and share trading strategies and to exchange trading models at an abstraction level that is higher than the mere data to which formulas and statistical computations are applied.

The necessity of finding relationships among a wider variety of asset classes and the drawbacks of currently available analysis tools place at a serious disadvantage any organizations and individual analysts that may otherwise benefit from diverse, complex, and accurate analysis of market conditions that pertain to a wide variety of assets. For example, the ability to accurately determine time periods during which particular assets satisfied particular market conditions may be beneficial in back-testing trading hypothesis and determining future trading strategies.

SUMMARY

In one embodiment, a method comprises: receiving first input that specifies a market instrument; receiving second input that specifies one or more parameters for one or more date set computers that are associated with the market instrument; receiving a first time series from a data repository, where the first time series is a sequence of data values associated with the market instrument; extracting a set of time periods by applying the one or more date set computers based on the one or more parameters and the first time series; and displaying the set of time periods overlaid on a graphical representation of the first time series in a graphical user interface.

In one feature, the set of time periods comprises a set of date ranges, where each date range includes a start date and an end date. In one feature, the set of time periods comprises a set of specific dates.

In another feature, at least one parameter in the second input specifies a metric associated with the market instrument. In this feature, the method further comprises deriving the first time series by determining the sequence of data values for the metric associated with the market instrument. Examples of a market instrument metric include, without limitation, the closing price of the market instrument, volatility of the market instrument, and the relative strength index (RSI) of the market instrument.

In yet another feature, the one or more date set computers include a first date set computer and a second date set computer. In this feature, the one or more parameters specify a method of combining the time periods generated by the first date set computer and the time periods generated by the second date set computer. Examples of a method of combining include, without limitation, a conjunctive combination and a disjunctive combination.

In one feature, the method may further comprise storing a market theme that comprises the one or more date set computers, the parameters that define each date set computer, and/or the set of date sets generated therefrom. In another feature, the method may further comprise storing an abstract market theme that comprises the one or more date set computers and the one or more parameters. In these features, the method may further comprise accessing a market theme and utilizing the information stored therein or generated therefrom to perform various types of analysis. Examples of such analysis include, without limitation, determining one or more other market instruments that are correlated to the market instrument over the set of time periods generated by a market theme, evaluating a trading strategy over the set of time periods generated by a market theme to determine what result would have been obtained if the trading strategy were actually executed during the set of time periods, applying the set of time periods generated by a market theme to a set of time series associated with a set of market instruments in order to determine how the set of market instruments would have performed during the set of time periods, and performing a regression analysis of a set of independent time series over the set of time periods generated by a market theme in order to model a dependent time series.

In another embodiment, a graphical user interface (GUI) comprises: a GUI component configured to receive first user input that specifies a market instrument; a first content pane configured to receive second user input that specifies one or more parameters for one or more date set computers associated with the market instrument; and a second content pane configured to display a set of time periods overlaid on a graphical representation of a first time series associated with the market instrument. The first time series is a sequence of data values associated with the market instrument. The set of time periods is determined by applying, based on the one or more parameters, the one or more date set computers to the first time series.

Other embodiments may comprise a computer system and machine-readable media operable to perform the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates a method of utilizing a market theme to find market instruments that are correlated during the set of time periods included in the market theme;

FIG. 2B illustrates a method of utilizing a market theme to retroactively evaluate a trading strategy over the set of time periods included in the market theme;

FIG. 2E illustrates a method of utilizing a market theme to perform regression analysis over the set of time periods included in the market theme;

FIG. 2F illustrates a method of utilizing an abstract market theme;

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Functional and Structural Overview

Figure 1A:
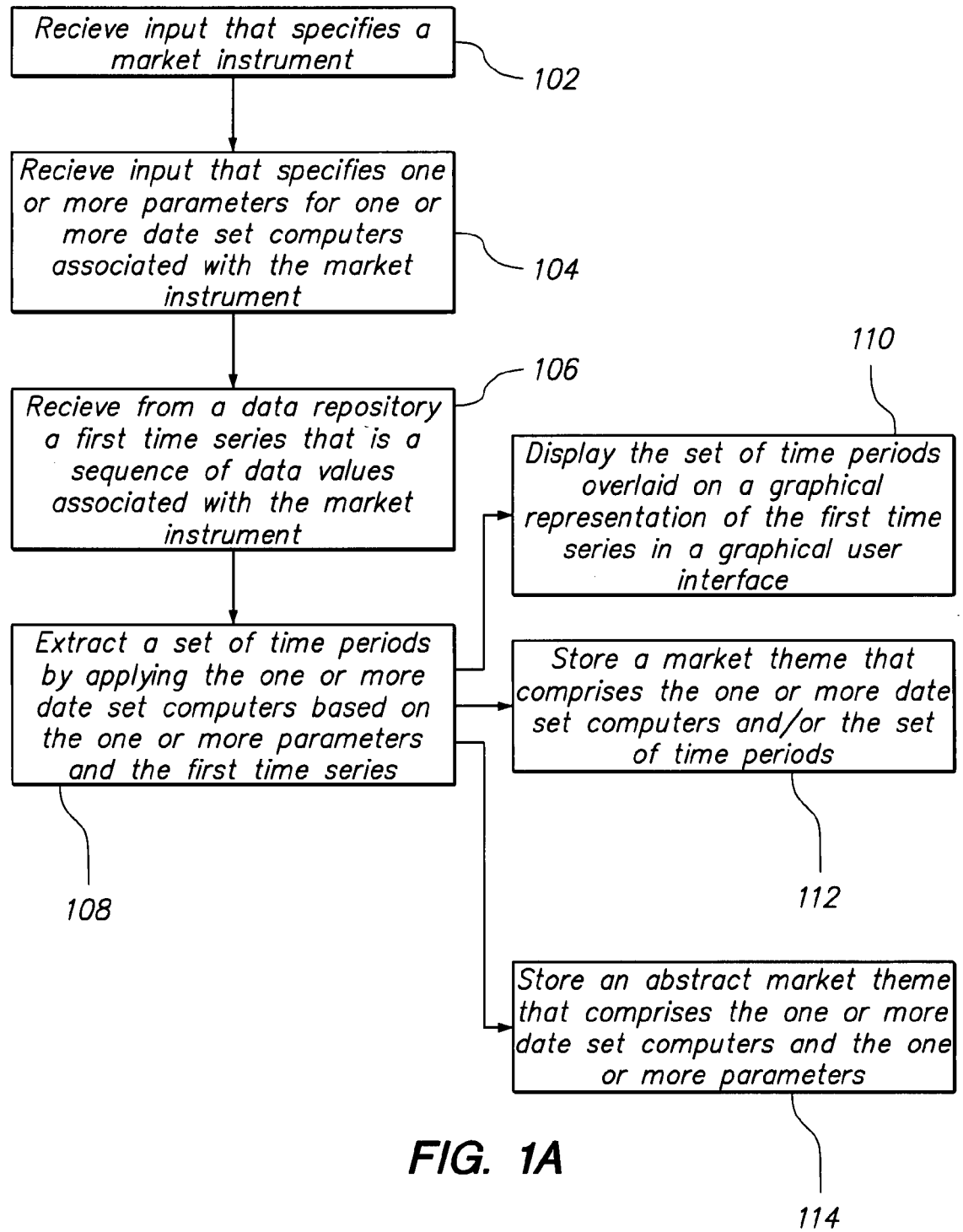
FIG. 1A illustrates an example method of generating market themes that represent market conditions.

FIG. 1A illustrates an example method of generating market themes that represent market conditions.

In step 102, first input that specifies a market instrument is received. As used herein, "market instrument" (or just "instrument") refers to a tradable element that has some kind of value. For example, any stocks and bonds and derivatives thereof (e.g. stock options, bond futures) may be represented as instruments that can be traded on stock markets and/or exchanges. Instruments may also represent various types of commodities, such as for example, crude oil, natural gas, or gold, and may be traded on commodities markets and exchanges. Instruments may also represent various financial assets and any derivatives thereof, for example, currencies, securities, loans, and various financial derivatives such as futures, options, swaps, and exotic derivatives. The examples of instruments provided herein are not in any sense limiting and are to be regarded in an illustrative rather than a restrictive sense.

In step 104, second input is received that specifies one or more parameters for one or more date set computers, which are associated with the market instrument. The one or more parameters define one or more market conditions, where the date set computers are operable to determine a set of time periods for which these market conditions existed for the market instrument.

As used herein, "date set computer" refers to a computer-implemented construct or logic that is operable to generate a set of time periods. A date set computer may include one or more input parameters, the values of which affect which set of time periods is generated when the date set computer is applied to one or more time series. For example, a date set computer may be implemented as a set of program instructions which, when executed by one or more processors, are operable to examine a time series associated with a market instrument and to determine the time period or periods during which a market condition defined by the parameters of the date set computer existed for the market instrument.

As used herein, a "set of time periods" refers to a set of non-overlapping intervals and/or date points on a possibly infinite time line. (The term "date", when used herein with respect to a point in time, may identify the point in time by a datetime value represented by various date parts including, without limitation, one or more of year, month, day, hour, minute, and seconds parts.) For example, {Jan. 1, 2005—Dec. 31, 2005} is an example set of time periods. Other example sets of time periods include without limitation:

{Mar. 10, 2006 at 10:43 am}, and

{x such as that x is between 9:00 am and 5:00 pm on a Monday, Wednesday, and Friday}.

In step 106, a time series associated with the market instrument is received from a data repository. As used herein, "time series" refers to a sequence of data values associated with one or more instrument metrics, which data values are measured and/or recorded at successive date-time points that may be spaced at some specified time intervals. A time series may be stored in one or more data repositories of any type including, without limitation, relational and/or object-oriented databases, data warehouses, directories, data files, and any other storage structures operable to store data.

As used herein, "metric" refers to a function which operates to produce and/or identify a time series associated with a market instrument. For example, the metrics of a stock instrument include, but are not limited-to, opening price, closing price, volatility, volume, market capitalization, relative strength index (RSI), dividend yield, 52-week low-high range, price-per-share to earnings-per-share (P/E) ratio and other valuation ratios, various profitability margins, and per-share earnings. In general, the types of metrics available for an instrument would depend on the particular type of the instrument.

In step 108, a set of time periods is extracted by applying the one or more date set computers to the time series of the specified market instrument based on the one or more specified parameters. For example, the one or more specified parameters may define a trending condition, according to which the closing price of the market instrument is trending up and/or down. When a trending date set computer is applied to a time series of the closing price of the market instrument, the date set computer determines and returns the time periods during which the closing price is trending up and/or down as defined by the one or more parameters.

In step 110, the set of time periods generated by the one or more date set computers are displayed in a graphical user interface. In one embodiment, the set of time periods may be overlaid on top of a graphical representation of the time series that is displayed in the graphical user interface.

According to some embodiments, in step 112 a market theme that comprises the one or more date set computers may be stored. As used herein, "market theme" refers to a computer-implemented construct or logic that is operable to store one or more date set computers and/or parameters and market instruments associated therewith, and to determine a set of time periods based on the one or more date set computers and/or the parameters and market instruments associated therewith.

According to some embodiments, in step 114 an abstract market theme may be stored. An "abstract" market theme refers to a market theme that is not associated with any particular market instrument, but may instead take a market instrument as an input parameter. An abstract market theme may comprise one or more date set computers and the parameters specified for these date set computers. An abstract market theme may be operable to continuously apply the date set computers stored therein to data that is newly received from financial markets or stock exchanges.

Once stored, the market theme and any information included therein may be used in various types of analysis. For example, the time periods generated by, or stored in, a market theme for a particular market instrument may be used to find other market instruments that exhibit similar characteristics during the time periods as the particular market instrument. In embodiments which use an abstract market theme, the date set computers and parameters thereof stored in the abstract market theme may be applied to a current time series of a market instrument to determine whether the market instrument satisfies a condition defined by the date set computer parameters during the current time period.

In some embodiments, the techniques described herein may be implemented as a client-server application. In these embodiments, a client component of the application may provide a graphical user interface that is configured to receive user input and to display results to a user. A server component of the application may be communicatively connected to a data repository and may be operable to derive time series based on user input that selects various market instruments and metrics thereof. In these embodiments, market themes and date set computers may be applied to time series by the client component, by the server component, and/or by a combination thereof.

In some embodiments, the techniques described herein may be implemented as a standalone application that is executing on a distributed or a non-distributed computer system. In other embodiments, the techniques described herein may be implemented as web-based services operating in a Service-Oriented Architecture (SOA) framework. Thus, the techniques described herein are not limited to implementation in any specific application paradigm or on any specific computer system, and for this reason the example embodiments described herein are to be regarded as in an illustrative rather than a restrictive sense.

II. Example Market Themes

Figure 1B:
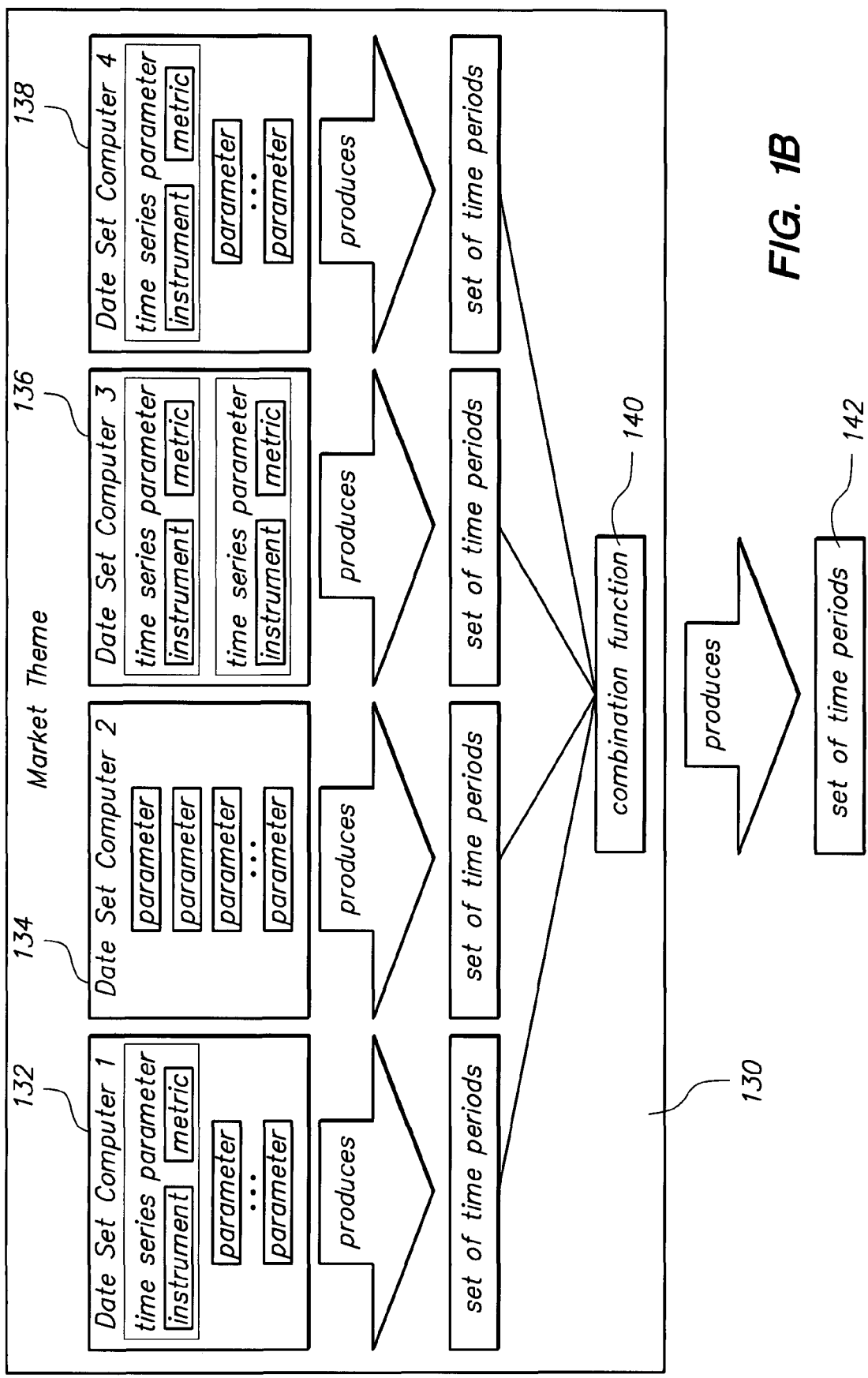
FIG. 1B illustrates a block diagram of an example market theme.

FIG. 1B illustrates a block diagram of an example market theme. Market theme 130 comprises date set computers 132, 134, 136, and 138, and combination function 140. For illustration purposes, market theme 130 includes four date set computers that are operable to receive different types of parameters. However, the techniques described herein are not limited to market themes that store any particular number of date set computers with any particular types of parameters. For this reason, the market theme illustrated in FIG. 1B is to be regarded in an illustrative rather than a restrictive sense.

Each of date set computers 132, 134, 136, and 138 is operable to receive one or more parameters. For example, the parameters associated with date set computer 132 include a time series parameter that specifies a market instrument and a metric for that market instrument. The parameters associated with date set computer 136 include two time series parameters, each of which specifies a market instrument and a metric for that market instrument.

Combination function 140 is a computer-implemented construct or logic that is operable to receive the sets of time periods generated by each of date set computers 132-138, and to generate a single result set of time periods 142.

In operation, market theme 130 may be accessed and date set computers 132-138 may be applied to the instruments and time series specified in the date set computers. When applied, each of date set computers 132-138 generates a set of time periods. Thereafter, market theme 130 may invoke combination function 142, which may combine the generated sets of time periods to determine the result set of time periods 142.

As an operational example, consider a market theme that comprises date set computers DSC1 and DSC2, and a combination function. DSC1 is operable to generate the set of time periods {x such that x is a Friday}, and DSC2 is operable to generate the set of time periods {x such that x is a day on which the closing price of stock "Z" is greater than 20}.

The combination function is defined as set_intersection(output(DSC1), output(DSC2)).

When applied, this market theme would generate the result set of time periods

{x such that x is a Friday on which the closing price of stock "Z" is greater than 20}.

An example of a market theme with a more complicated combination function would be a market theme comprising the date set computers {DSC3, DSC4, DSC5}, where the combination function is defined as set_intersection(set_union(output(DSC3), output(DSC4)), set_complement(output(DSC5))).

Abstract Market Themes

In one embodiment a user may store an abstract market theme that is a computer-implemented construct or logic operable to take as input one or more market instruments and to output a set of time periods, where the output time periods may be recomputed continuously on the fly as new time series data enters the system. For example, when an abstract market theme is applied to some particular market instrument "Z", the abstract market theme may generate the following set of time periods:

{x such that x is a day during which the closing price of "Z" was greater than the opening price of "Z"}.

Market Theme Storage and Sharing

In some embodiments, a market theme may be implemented as an object, which may be stored in volatile memory and/or in persistent storage and which may be accessed by multiple users and/or applications. In other embodiments, a market theme may be implemented as any computer construct or data structure that is operable to store computer-executable instructions. The techniques described herein are not limited to any particular implementation of a market theme.

In some embodiments, a market theme may be stored as an object that may be accessible for performing various types of analysis by multiple other users, processes, services, and applications. For example, a market theme object may be stored in volatile memory and may be accessible by application processes or threads that perform various types of analysis based on the date set computers and/or any date ranges and user-specified parameters stored in the market theme object. In addition, or instead of, a market theme object may be stored persistently in non-volatile storage for later use.

In some embodiments, different users may store their own market themes, and stored market themes owned by different users may be shared among users. For example, a user may provide a name for a market theme that includes computed time periods, date set computers, and/or parameters thereof The users may also provide a description for a stored market theme, and when sharing the market theme, may provide the description to users with which the market theme is shared.

III. Example Date Set Computers

Trending Date Set Computer

In one embodiment, a trending date set computer is operable to examine time series associated with a metric of a market instrument, and to determine the date ranges during which the time series is trending up and/or down as defined by parameters provided by a user.

For example, suppose that a user wants to determine the time periods during which the closing price of a selected stock instrument is trending up and/or down. The user may provide one or more parameters for the trending date set computer, where the parameters may include values that identify the selected stock instrument and specify the closing price as the instrument metric. The user may also provide as parameters values that characterize the trends of interest to the user, for example, duration (e.g. number of days) of a trend, precision (e.g. percentage of time that the trend must match the underlying time series), and the type of the trends (e.g. up and/or down trends).

According to the techniques described herein, a time series is retrieved from a data repository, where the time series comprises the values of the closing price of the selected stock instrument. The time series may be derived from data records associated with the selected stock instrument and may be stored in any logical data structure, such as, for example, an array.

Thereafter, in this embodiment the time series is plotted as a time series line on a chart in a graphical user interface. Based on the parameter values received from the user, the trending date set computer or another software component computes trend lines and displays the computed trend lines overlaid on the time series line in the chart. The computed trend lines reflect the parameters specified by the user—up and/or down trend lines are computed as specified by the user, and the duration of the trends represented by the trend lines also conforms to the duration parameter value specified by the user.

Based on the time series and the user-specified parameters, the trending date set computer also determines the date ranges during which the closing price of the selected stock instrument is trending. In this embodiment, the trending date set computer determines the date ranges in response to the user providing the parameters for the date set computer. When determined, in this embodiment the date ranges are displayed on the graphical user interface as shaded regions that overlay the trend lines and the time series line on the chart. The user may then adjust the parameters of the trending date set computer in order to determine the exact trends that the user is interested in for the closing price of the selected stock instrument. In response, the trending date set computer would re-compute the date ranges. The time series line, the new trending lines reflecting the new parameters, and the new shaded regions indicating the re-computed date ranges would be plotted on the chart in the graphical user interface. This process of displaying the time series lines, the trend lines, and the date range regions aids the user's understanding about the causes behind the computation of the date ranges and helps the user to determine the exact trends that the user is interested in.

Thereafter, in response to user input, the trending date set computer, the determined date ranges, and/or the user-specified parameters may be stored in a market theme. The market theme represents the trending market conditions that were specified by the user through the trending parameters with respect to the selected stock instrument.

Above/Below Date Set Computer

In one embodiment, an above/below date set computer is operable to examine time series associated with a metric of a market instrument, and to determine the date ranges during which the time series is within a specified value range as defined by parameters provided by a user.

For example, suppose that a user wants to determine the time periods during which the closing price of a selected stock instrument is above a certain value. The user may provide one or more parameters for the above/below date set computer, where the parameters may include values that specify the closing price as the instrument metric. The user may also provide as parameters values that define the certain value range that the user is interested in, for example, a value range of at least $64.00.

According to the techniques described herein, a time series is retrieved from a data repository, where the time series comprises the values of the closing price of the selected stock instrument. Thereafter, the time series is plotted as a time series line on a chart in a graphical user interface. Based on the parameter values received from the user, the above/below date set computer or another software component determines the regions in which the time series is within the user-specified value range, and displays horizontal lines indicating the determined regions overlaid on the time series line in the chart.

The user may then adjust the parameters of the above/below date set computer, and in response, the date set computer would re-compute and re-display the date ranges. Thereafter, in response to user input, the above/below date set computer, the determined date ranges, and/or the user-specified parameters may be stored in a market theme. The stored market theme represents the above/below market conditions that were specified by the user through the above/below parameters with respect to the selected stock instrument.

Peaks/Troughs Date Set Computer

In one embodiment, a peaks/troughs date set computer is operable to examine time series associated with a metric of a market instrument, and to determine the dates during which the metric is at a peak or a trough as defined by parameters specified by a user.

For example, suppose that a user wants to determine the time periods during which the closing price of a selected stock instrument is at a peak or a trough. The user may provide one or more parameters for the peaks/troughs date set computer, where the parameters may include values that identify the stock instrument and specify the closing price as the instrument metric. The user may also provide as parameters values that define the maximum duration (e.g. in number of days) of a peak or a trough, and the minimum height of the peak or trough.

According to the techniques described herein, a time series is retrieved from a data repository, where the time series comprises the closing prices of the selected stock instrument. Thereafter, the time series is plotted as a time series line on a chart in a graphical user interface. Based on the time series and the user-specified parameters, the peaks/troughs date set computer also determines the date ranges during which the closing price of the selected stock instrument is at a peak and/or trough that satisfies the user-specified duration and minimum height. In this embodiment, the peaks/troughs date set computer determines the date ranges in response to the user providing the parameters of the date set computer. When determined, the date ranges are displayed on the graphical user interface (e.g. as shaded regions, labels, or triangular hats) that overlay the time series line on the chart. The user may then adjust the parameters of the peaks/troughs date set computer, and in response, the date set computer would re-compute and re-display the date ranges. The user may store the peaks/troughs date set computer, the determined date ranges, and/or the user-specified parameters in a market theme. The stored market theme represents the peaks/troughs market conditions that were specified by the user through the peaks/troughs parameters with respect to the selected stock instrument.

Parameters for Date Set Computers

In some embodiments, the parameters for date set computers may include a time series parameter. A "time series parameter" refers to a parameter that uniquely identifies a time series associated with a market instrument. A time series parameter specified for a date set computer may include the names (or other identifiers) of a market instrument and/or of an instrument metric.

In some embodiments, a date set computer may not need a time series parameter in order to generate a set of time periods. An example of such date set computer is a date set computer which generates the set of time periods
{x such that x is a Friday}.

In other embodiments, a date set computer may need only a single time series parameter to generate a set of time periods. An example of such date set computer is a date set computer that generates the set of time periods
{x such that x is a day on which the closing price of stock "Z" is greater than 20}.

In other embodiments, a date set computer may need two or more time series parameters to generate a set of time periods. An example of such date set computer is a date set computer that generates the set of time periods
{x such that x is a day on which the volatility of stock "X" was greater than the volatility of stock "Y"}
where the date set computer would need a time series of the volatility of stock "X" and a time series of the volatility of stock "Y" in order to determine the above set of time periods.

In some embodiments, a date set computer may include a reference to a market instrument but not to a time series associated with that instrument. For example, the date set computer which represents dates on which the stock (MSFT) of Microsoft Corporation issues a dividend references the instrument "MSFT" but does not reference, either directly or via a metric, any time series associated with the Microsoft Corporation stock.

Date Set Computers Generating Specific Dates

Some market conditions may exist for particular instruments only on particular dates. With respect to such market conditions, the techniques described herein provide date set computers that generate a set of specific dates on which the particular market conditions exist for some specified instrument metrics. An example of a set of specific dates may be:
{May 15, 2006 at 11:31 am; Jun. 21, 2006 at 9:22 am; Jul. 9, 2006 at 2:26 pm}

Date set computers that generate a set of specific dates may be used to evaluate event-based market conditions, that is, market conditions which represent events occurring on specific dates (as opposed to conditions that may continuously exist during a period of several days). An example of a date set computer that generates a set of specific dates is a peaks/troughs date set computer.

In one embodiment, a user may specify a particular mechanism through which time periods generated by multiple date set computers are to be combined. This embodiment may provide GUI components configured for receiving calendar-based, recurring intervals of time for which the multiple date set computers are to be applied to time series of one or more metrics of one or more market instruments. For example, user input may specify a periodic range selector which indicates that one or more specified date set computers are to be evaluated only for the $3^{rd}$ Friday of each month. In another example, user input may specify a periodic range selector which indicates that the date set computers are to be applied to time series of metric values that were recorded on particular days of the week, e.g. only for Tuesday, Wednesday, and Thursday of each week.

Combining Time Periods Generated By Multiple Date Set Computers

In some operational contexts, more than one market condition may be of interested to a user. For example, a user may need to determine time periods during which a plurality of market conditions exists for a particular market instrument. According to the techniques described herein, user input may be received that specifies a plurality of parameters for a plurality of date set computers associated with the same or different market instruments. The user input may also specify a particular combination involving the plurality of date set computers, where the combination defines how any time periods generated by the plurality of date set computers are to be used to determine a combined result set of time periods.

For example, a user may need to determine the time periods during which the closing price of a selected stock instrument is trending up and also is above a particular value. According to the techniques described herein, in one embodiment the user may specify parameters for a trending date set computer and an above/below date set computer. The parameters provided for the trending date set computer may include values specifying the duration of the up-trends of interest and the precision with which trend lines representing the up-trends need to fit to the time series of the closing price of the selected instrument. The parameters provided for the above/below date set computer may include values that define the certain range for the closing price of the selected stock instrument that the user is interested in.

According to the techniques described herein, a time series is retrieved from a data repository, where the time series comprises the values of the closing price of the selected stock instrument. Thereafter, the time series is plotted as a time series line on a chart in a graphical user interface. Based on the parameters provided for the trending date set computer, the trending date set computer determines the date ranges during which the closing price of the selected stock instrument is trending up. The determined date ranges are then displayed in the graphical user interface as shaded regions overlaid on the time series line on the chart. Similarly, based on the parameters provided for the above/below date set computer, the above/below date set computer determines the date ranges during which the closing price of the selected stock instrument is above the user-specified value. The determined date ranges are then displayed in the graphical user interface as shaded regions overlaid on the time series line on the chart.

The date ranges generated by the trending date set computer and the above/below date set computer are then combined to determine the final result set of date ranges. Since the user specified, through the user input, that she is interested in the time periods during which the closing price is both trending up and above a particular value, the result set of date ranges is the intersection (e.g. an "AND" operation) of the date ranges generated by the trending and above/below date set computers. The intersection of the date ranges may be displayed in the graphical user interface as a region that is shaded in a different color than the shaded regions representing the date ranges generated by the trending and above/below date set computers.

In this embodiment, the user may adjust the parameters of the trending and above/below date set computers, and in response, the date set computers would re-compute and re-display the date ranges as well as the intersection thereof, which represents the resulting set of date ranges. The user may also store the trending and above/below date set computers, the resulting set of date ranges, and/or the user-specified parameters in a market theme for later use and analysis.

The techniques for combining the time periods generated by multiple date set computers are not limited to particular types and numbers of combinations, date set computers, instrument metrics, and instruments. For example, in some embodiments a plurality of date set computers may be applied to a plurality of time series for the same metric of a plurality of different market instruments. In some embodiments, a plurality of date set computers may be applied to a plurality of time series for a plurality of metrics of the same market instrument. In some embodiments, the time periods generated by a plurality of date set computers may be applied in a disjunctive manner (e.g. an "OR" operation), that is, the result set of time periods may include all time periods generated by the plurality of date set computers. In some embodiments, the time periods generated by a plurality of date set computers may be used to generate the resulting set of time periods by applying to the time periods some arbitrary set of operations specified by the user. Examples of such operations include, but are not limited to, "AND" operations, "OR" operations, "AT LEAST N" operations, "COMPLEMENT" operations, and any combinations and permutations thereof. For this reason, the examples of combining time periods generated by multiple date set computers described herein are to be regarded in an illustrative rather than a restrictive sense.

Additional Features and Alternative Embodiments

While in the above examples the time series to which date set computers are applied is based on the closing price of a stock instrument, other embodiments and implementations may use different instrument metrics to derive different time series to which different types of date set computers may be applied. For example, other implementations may apply various types of date set computers to time series derived for various instrument metrics, such as, for example: volatility (implied or historical) metrics, RSI metrics, volume metrics, market capitalization metrics, moving average metrics, z-score metrics (also known as number of standard deviations from the moving average), and for various other metrics.

IV. Examples of Market Theme-Based Analysis

Depending on the operational context, the information stored in a market theme may be used to perform various types of analysis involving one or more market instruments. For example, the date set computers and the parameters thereof stored in an abstract market theme may be used to analyze current market data for specific market instrument or instruments. Examples of different types of analysis are provided hereafter; however, the techniques described herein are not limited to any particular type of market analysis, and thus the provided examples are to be regarded in an illustrative rather than a restrictive sense.

Searching For Correlated Market Instruments

Given two market themes and a starting market instrument, a search may be performed to find market instruments that are correlated with the starting instrument. The first market theme defines a set of time periods that will be the window over which the correlation is performed. The date set computers stored in the second market theme can be applied first to a time series associated with the starting instrument to generate a set of time periods within the window produced by the first market theme, and then to time series associated with other market instruments of a particular set of instruments. The time periods within the window produced for the other instruments in the set can be compared to the time periods produced when applying the date set computers to the starting instrument to look for correlated instruments that generate similar time periods in this window by applying the date set computers. This type of analysis may be used to determine whether particular relationships or correlations exist in a set of market instruments based on the information stored in a market theme, where the market theme may be generated with respect to a starting market instrument that may or may not belong to the set of instruments.

FIG. 2A illustrates a method of utilizing market themes to find market instruments that are correlated to a given market instrument during a set of time periods. In step 202, a first market theme that comprises one or more date set computers is stored. In an example embodiment, the market theme may be stored as a data structure (e.g. object) in volatile memory or on persistent storage.

In step 204, a second market theme is accessed. The second market theme defines a time window over which correlation is to be performed. For example, in one embodiment the second market theme may include one or more date set computers that may be used to determine one or more sets of time periods that define the time window.

In step 206, a set of time periods is determined within the time window by applying the one or more date set computers stored in the first market theme to the time series of a starting market instrument. The starting market instrument is the instrument with respect to which correlation is to be performed.

In step 208, the plurality of time series associated with a plurality of market instruments are evaluated over the set of time periods in the time window. For example, in one embodiment the one or more date set computers stored in the first market theme may be applied to the time series of each market instrument in a particular plurality of market instruments. The time periods generated by the one or more date set computers for the plurality of market instruments may then be compared to the time period generated for the starting market instrument.

In step 210, a determination is made whether one or more market instruments of the plurality of market instruments are correlated to the starting instrument during the set of time periods within the time window. In an example embodiment, the correlation determination may further be based on some additional criteria, which may be specified by a user and which may affect how the comparison of time periods is performed.

Back-Test Analysis

Back-test analysis refers to analysis in which a trading strategy is executed over historical data to determine what result would have been obtained if the trading strategy was actually performed at a certain time in the past. Back-test analysis is useful in situations where a user needs to verify one or more hypothesis that involve trading actions associated with one or more market instruments. According to the techniques described herein, time periods stored in a market theme may be used to limit the scope of historical time series based on which back-test analysis is performed. For example, by using the techniques described herein, a user may determine the time periods she is interested in (for example, the time periods during which a particular market instrument is trending up) and may store these time periods in a market theme. The user may then perform back-test analysis of a particular trading strategy only for the time periods stored in the market theme.

FIG. 2B illustrates a method of utilizing a market theme to retroactively evaluate a trading strategy over the time periods stored in the market theme. In step 212, a market theme is stored. In an example embodiment, the market theme may include time periods generated by one or more date set computers based on user-specified parameters and a time series for a user-specified market instrument.

In step 214, the market theme is accessed and the time periods stored therein are retrieved. In an example embodiment, the retrieved time periods may be displayed on a chart in a graphical user interface.

In step 216, a back-test analysis is performed based on the retrieved time periods. In an example embodiment, time series associated with the market instruments involved in the back-test analysis are retrieved from a data repository. The time series may be filtered to include only data values corresponding to the time periods retrieved from the market theme. Thereafter, the trading actions specified in the back-test analysis may be performed on the filtered time series to determine the result that would have been obtained if the trading actions were actually performed during the time periods specified in the market theme. Depending on the particular type of back-test analysis, current values of metrics for the market instruments involved in the back-test analysis may be used to determine the result of the analysis, and the result may be returned or graphically displayed to the user.

Analyzing an Aggregate Statistic Over Market Theme Time Periods

According to the techniques described herein, time periods stored in a market theme may be used to analyze and compute the value of an aggregate statistic of a particular market instrument. For example, by using the techniques described herein, a user may determine the time periods she is interested in (for example, the time periods during which a particular market instrument is trending up) and may store these time periods in a market theme. The user may then evaluate the statistic of interest by analyzing a time series associated with the market instrument only for the time periods stored in the market theme.

Figure 2D:
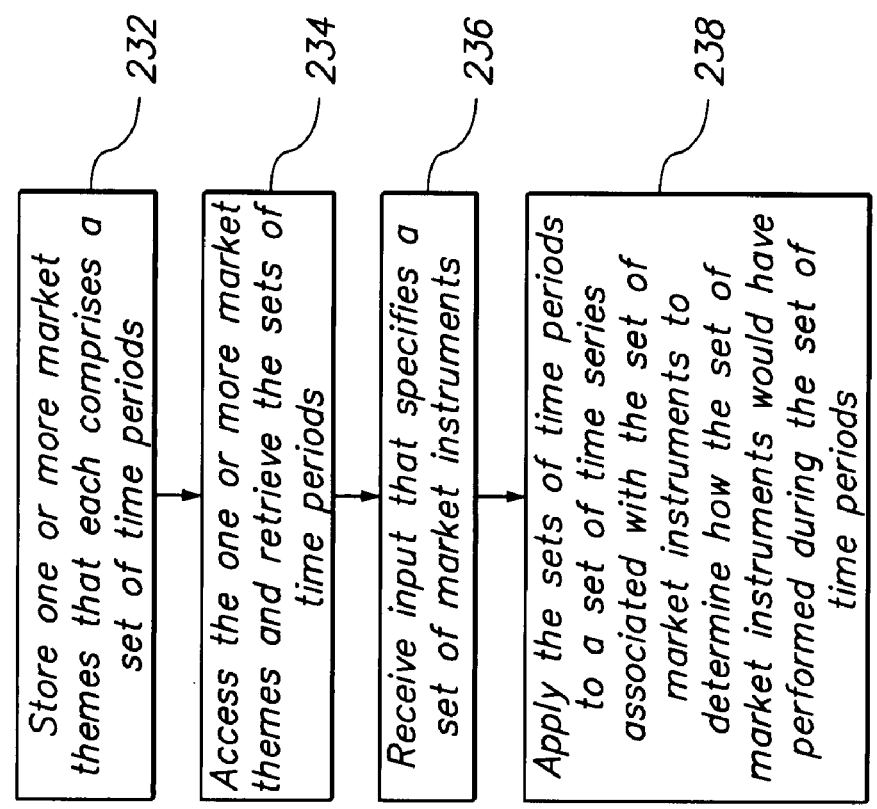
FIG. 2D illustrates a method of utilizing market themes to evaluate the performance of a portfolio of market instruments over the sets of time periods included in the market themes.
Figure 2C:
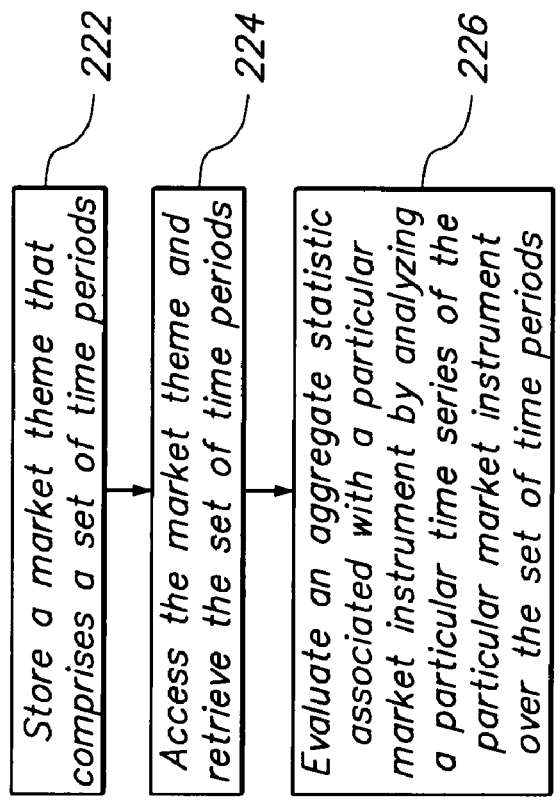
FIG. 2C illustrates a method of utilizing a market theme to evaluate the performance of a particular instrument metric over the set of time periods included in the market theme.

FIG. 2C illustrates a method of utilizing a market theme to evaluate an aggregate statistic over the set of time periods included in, or defined by, the market theme. In step 222, a market theme is stored. In an example embodiment, the market theme may include time periods generated by one or more date set computers based on user-specified parameters and may identify a time series for a user-specified market instrument.

In step 224, the market theme is accessed and the time periods stored or defined therein are retrieved. In an example embodiment, the retrieved time periods may be displayed on a chart in graphical user interface.

In step 226, an aggregate statistic of the market instrument may be evaluated based on the time periods retrieved from the market theme. A time series associated with the market instrument (or for a metric thereof, e.g. closing price) may be retrieved from a data repository. The time series may be filtered to include only data values corresponding to the time periods retrieved from the market theme. Thereafter, the statistic of interest may be computed only over the time periods retrieved from the-market theme. For example, the statistic of interest may be volatility or annualized return that may be evaluated over the time periods retrieved or determined from the stored market theme.

Analyzing a Market Portfolio Over Market theme Time Periods

According to the techniques described herein, a portfolio of one or more market instruments may be analyzed over the time periods stored in, or defined by, one or more market themes. Such analysis may provide insight into how a selected set of instruments is performing over the time periods stored in all market themes that are of interest to a user. For example, by using the techniques described herein, a user may determine all the time periods she is interested in and may store these time periods in one or more market themes. The user may then evaluate the performance of a set of instruments by analyzing the instruments (and/or any metrics thereof) only for the time periods stored in the market themes.

FIG. 2D illustrates a method of utilizing market themes to evaluate the performance of a portfolio of market instruments over the sets of time periods included in the market themes. In step 232, one or more market themes are stored. In an example embodiment, each stored market theme may include time periods generated by one or more date set computers based on user-specified parameters and a time series for a user-specified market instrument.

In step 234, the one or more market themes are accessed and the time periods stored therein are retrieved. In step 236, user input is received. In an example embodiment, the user input specifies a set of market instruments that are of interest to a user.

In step 236, a time series of each market instrument of the set of market instruments is evaluated based on the time periods retrieved from the market themes. For example, a time series associated with each market instrument (or with a metric thereof, e.g. closing price) may be retrieved from a data repository. Each retrieved time series may be filtered to include only data values corresponding to the time periods retrieved from the market themes. Thereafter, the filtered time series may be evaluated to determine the performance of the set of market instruments over the time periods retrieved from the market themes. For example, the annualized return of the set of market instruments may be based on the performance of each market instrument over each of the time periods retrieved from the market themes.

Regression Analysis Over Market Theme Time Periods

Regression analysis refers to analysis in which linear regression is performed over a set of independent time series in order to model a dependent time series. According to the techniques described herein, regression analysis may be performed over time series that have been filtered based on time periods stored in a market theme. For example, by using the techniques described herein, a user may determine the time periods she is interested in and may store these time periods in a market theme. Regression analysis may then be performed over time series of independent market instruments only for the time periods stored in the market theme.

FIG. 2E illustrates a method of utilizing a market theme to perform regression analysis over the set of time periods included in the market theme. In step 242, a market theme is stored. In an example embodiment, the market theme may include time periods generated by one or more date set computers based on user-specified parameters and a time series for a user-specified market instrument. In step 244, the market theme is accessed and the time periods stored therein are retrieved.

In step 246, a set of time series for one or more market instruments (and/or for one or more metrics thereof) are accessed. In an example embodiment, each time series of the set of time series may be retrieved from a data repository and may be filtered to include only data values corresponding to the time periods retrieved from the market theme. Thereafter, in step 248 regression analysis may be performed over the set of filtered time series.

For example, a user may store a market theme that is generated by identifying the time periods during which gold has been trending up. A regression analysis may be performed based on the market theme to determine whether there is any correlation between the closing prices of crude oil, heating oil, and the stock of a particular company during the time periods stored in the market theme. In another example, a user may store a market theme that is determined based on the closing price of gold, where the market theme also stores the date set computers and the parameters thereof. In this example, a regression analysis may performed based on the market theme to determine whether a correlation between the closing price of crude oil and heating oil exists only during time periods when the closing price of gold is trending up (as defined by the date set computers and parameters stored in the market theme).

Using Abstract Market Themes in Real-Time Market Analysis

Abstract market themes may be used in real-time analysis of market data. As used herein, "real-time" analysis refers to analysis performed on market data that is received in real or near-real time. Real-time analysis may provide insight into how a selected market instrument is performing at the present time, and whether any specific trading actions need to be executed. According to the techniques described herein, an abstract market theme may be used against an instrument metric to determine whether market conditions that warrant a particular trading action (e.g. buy, sell, etc.) exist at the present time, where the market conditions are defined by the date set computers and any parameters thereof that are stored in the market theme.

FIG. 2F illustrates a method of utilizing an abstract market theme. In step 252, an abstract market theme is stored. In an example embodiment, the abstract market theme may include one or more date set computers and/or parameters thereof that were specified by a user for the time series of a specific market instrument. In step 254, the abstract market theme is accessed, and the date set computers and the parameters stored therein are retrieved.

In step 256, the date set computers are automatically applied based on their parameters to the current values of one or more metrics of a market instrument in order to determine whether the current time period is included in time periods that would be generated by applying the abstract market theme to the market instrument. For example, the date set computers may be applied to a time series of the market instrument (or of a metric thereof) as the data values in the time series are received from a stock exchange. In another example, the date set computers may be applied periodically and/or at some predetermined intervals to the time series of the market instrument (or of the metric thereof).

In step 258, a notification is automatically sent when a determination is made that the current time period satisfies the market conditions defined by the date set computers and the parameters thereof stored in the abstract market theme. Example embodiments may send various types of notifications including, but not limited to, e-mails, SMS messages, and pop-up messages.

In one example embodiment, an abstract market theme may be used in the above manner to configure the automatic sending of a notification to let a user know when the trading status of a particular market instrument changes with respect to the market conditions specified by the date set computers and the parameters thereof stored in the market theme. For example, a user may be automatically notified when the previous day the closing price of a particular stock was trending up but at the present time this is no longer the case. In other words, the abstract market theme may be used in a real-time analysis of the particular market instrument to notify the user when the particular market instrument starts to trend in a different direction. Abstract market themes may be used in a similar manner in order to determine, and automatically notify users, when any events of interest to the users (e.g. with respect to one or more market instruments) may be occurring.

V. Example Graphical User Interface

Figure 3A:
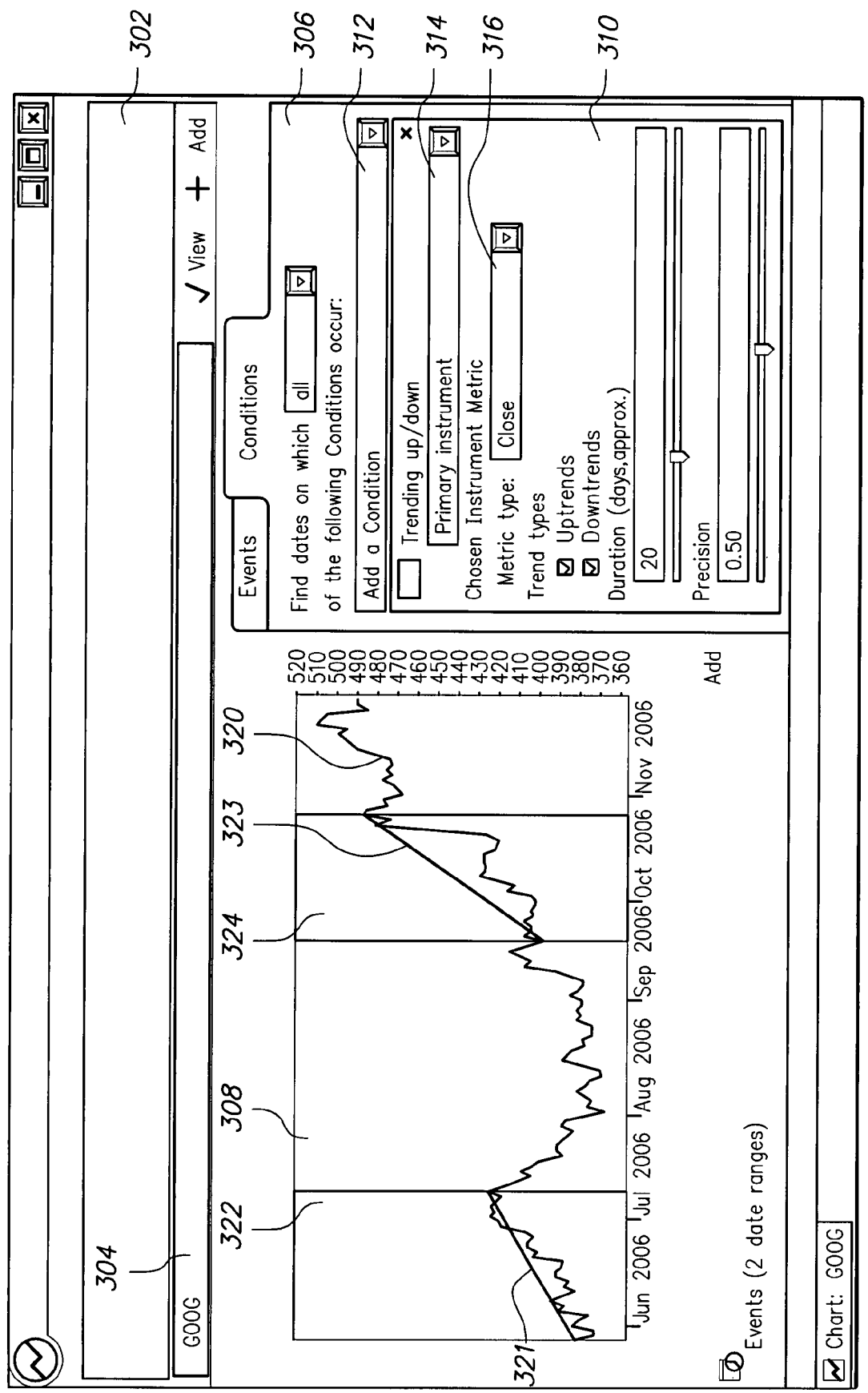
FIGS. 3A and 3B illustrate an example graphical user interface.
Figure 3B:
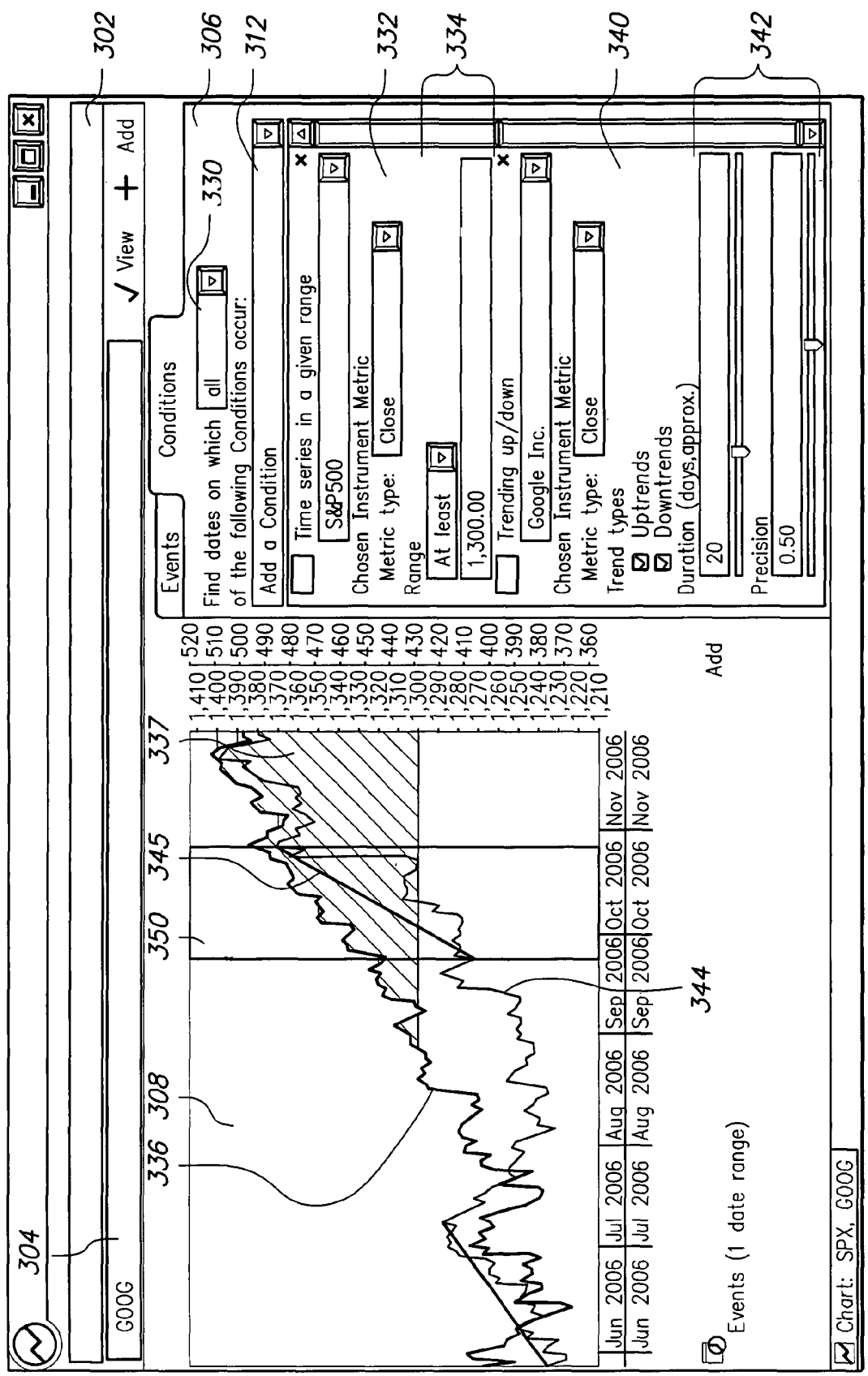

FIGS. 3A and 3B illustrate an example graphical user interface that may be used to receive user input and to display time periods generated by date set computers. In an example embodiment, the graphical user interface may be implemented as a set of program instructions which, when executed by one or more processors, are operable to render the graphical user interface on the display of a computer system. In various embodiments, the set of program instructions operable to generate the graphical user interface may be included in a standalone application or in a client component of a client-server application.

FIG. 3A illustrates graphical user interface 302. Graphical user interface 302 comprises GUI component 304, and content panes 306 and 308. As used herein, "content pane" refers to a graphical representation object that is configurable to include one or more GUI components. Content panes may be included in frames. As used herein, "frame" refers to a graphical representation object that is configurable to include one or more content panes and/or GUI components. Examples of frames include, but are not limited to, dialog boxes, forms, and various other types of window containers.

GUI component 304 is configured to receive user input that specifies a market instrument. In the example embodiment illustrated in FIG. 3A, GUI component 304 is a text field configured to receive text input from a user. In other embodiments, GUI component 304 may be a component (e.g., drop-down box, list box, etc.) that is configured to receive from a user a selection which indicates a market instrument. In some embodiments, GUI component 304 may be provided within a content pane, such as, for example, content pane 306.

Content pane 308 comprises a chart on which time series associated with one or more market instruments (or with any metrics thereof) may be plotted. In the example embodiment illustrated in FIG. 3A, the horizontal axis of the chart is a time axis and the vertical axis of the chart reflects the magnitude of the data values included in the time series. A time series may be plotted on the chart as an unbroken line. Other embodiments may utilize graphical representations of time series that may be different from a line, such as, for example, candle bars and Open-High-Low-Close (OHLC) bars.

Content pane 306 comprises drop-down box 312. Drop down box 312 lists the various types of date set computers available in the example embodiment illustrated in FIG. 3A. Drop-down box 312 is configured to receive user input selecting a date set computer. In response to a user selecting a date set computer, a panel associated with that date set computer is displayed in content pane 306. As used herein, "panel" refers to a graphical representation object which can be included in a content pane and which is configurable to include one or more GUI components. Examples of GUI components include, but are not limited to, buttons of various types, check boxes, combo boxes, labels, lists, progress bars, scroll bars, sliders, status bars, tables, tabs, text fields, trees, and toolbars.

Content pane 306 may comprise one or more panels that are configured to receive user input which specifies parameters for one or more date set computers. Each panel included in content pane 306 may comprise a GUI component configured to receive user input that specifies the market instrument to which the date set computer associated with that panel is to be applied. Each panel included in content pane 306 may also comprise a GUI component configured to receive user input that specifies a particular metric of the selected market instrument, where the particular metric indicates a time series to which the date set computer associated with that panel is to be applied. Each panel included in content pane 306 may also comprise one or more GUI components configured to receive parameter values for the date set computer associated with that panel.

For example, in the embodiment illustrated in FIG. 3A, panel 310 is associated with a trending date set computer. Panel 310 comprises drop-down box 314, which is configured to receive the user input that specifies the market instrument to which the trending date set computer is to be applied. Panel 310 also comprises drop-down box 316, which is configured to receive user input that specifies a particular metric for the market instrument specified in drop-down box 314. In the example illustrated in FIG. 3A, the metric specified for the market instrument is the closing price of the market instrument. In other examples, drop-down box 316 may provide the user with selections indicating various instrument metrics including, but not limited to, market capitalization, volume, volatility (historical or implied), RSI, etc.

Depending on the particular date set computer with which a panel is associated, the panel may include one or more GUI components configured to receive user input that specifies the parameters associated with that particular date set computer. For example, panel 310 in FIG. 3A is associated with a trending date set computer. Thus, panel 310 includes two check boxes which are configured to receive user input specifying up-trends and down-trends, respectively. Further, panel 310 includes a text box and a slider configured to receive user input specifying the duration of a trend, and a text box and a slider configured to receive user input specifying the precision with which the trends identified by the date set computer must match the underlying time series.

In the operational example illustrated in FIG. 3A, suppose that a user wants to determine the time periods during which the Google, Inc. stock is trending up and down. First, the user enters the Google, Inc. stock ticker "GOOG" in GUI component 304 as the market instrument to which a trending date set computer is to be applied. Next, the user selects the trending date set computer from drop-down box 312. In response to the user selection, panel 310 is displayed in content pane 306. By default, drop-down box 314 in panel 310 displays the value "Primary Instrument", which refers to the market instrument specified in GUI component 304. The user then selects from drop-down box 316 the closing price as the metric with respect to which the trends of the "GOOG" stock instrument are going to be determined. The user then may select, through the trend type check boxes in panel 310, what type of trends she is interested in. (In the example embodiment of FIG. 3A, both up-trends and down-trends are selected by default.) The user then enters the duration parameter value "20" and the precision parameter value "0.50" in the corresponding text boxes. (The user may also enter these parameters by using the corresponding sliders.)

In response to receiving the duration and/or the precision parameter from the user, the trending date set computer is applied to a time series that comprises the values of the closing price of the "GOOG" stock instrument. (Some embodiments may provide different mechanisms for triggering the application of a date set computer, for example, by providing a button or another GUI component that is configured to receive user input.) The trending date set computer (or another software component) retrieves the "GOOG" closing price time series from a data repository. The time series is then plotted on the chart in content pane 308 as time series line 320.

According to the techniques described herein, based on the duration and precision values specified by the user, the trending date set computer associated with panel 310 (or another software component) computes the trend lines for up-trends and down-trends from the time series of the closing price of the "GOOG" stock instrument. As illustrated in FIG. 3A, the trending date set computer determines that there exist two up-trends satisfying the duration and precision values specified by the user, which trends are displayed on the chart in content pane 308 as trend lines 321 and 323.

The trending date set computer also determines the date ranges during which the closing price of the "GOOG" stock instrument is trending. The trending date set computer displays the determined date ranges as regions 322 and 324, which correspond to and are overlaid on trend lines 321 and 323, respectively. As illustrated in content pane 308, the date ranges in which the closing price of the "GOOG" stock instrument is trending may be, for example, May 23, 2006 to Jul. 10, 2006, and Sep. 21, 2006 to Oct. 25, 2006.

According to the techniques described herein, the user may then adjust the duration and precision values in panel 310 in order to determine the exact trends that the user is interested in for the closing price of the "GOOG" stock instrument. In response, the trending date set computer would re-compute the date ranges, and the new trend lines and the new regions indicating the re-computed date ranges would be re-displayed on the chart in content pane 308.

Thereafter, in response to user input, the trending date set computer, the determined date ranges, and/or the duration and precision parameters may be stored in a market theme. The market theme represents the trending market conditions that were specified by the user through the trending parameters with respect to the closing price of the "GOOG" stock instrument.

FIG. 3B illustrates an operational example in which multiple date set computers are used to determine time periods in which particular market conditions existed for multiple market instruments. In FIG. 3B, content pane 306 comprises drop-down box 330, which is configured to receive user input that specifies a method of combining time periods generated by each of the multiple date set computers to determine a result set of time periods. Examples of such combinations include, but are not limited to, conjunctive combinations and disjunctive combinations. The time periods could also be combined using any arbitrary combination of set operations. In some embodiments, a graphical user interface may include GUI components configured to receive user input that specifies arbitrary expressions that aggregate multiple date set computers and determine how the time periods generated therefrom are combined to obtain the result set of time periods.

According to the operational example illustrated in FIG. 3B, a user wants to determine the time periods during which the Google, Inc. stock is trending up and the Standard & Poor (S&P) index is above 1,300.

First, the user enters the Google, Inc. stock ticker "GOOG" in GUI component 304 as the market instrument to which a trending date set computer is to be applied. Next, the user selects the trending date set computer from drop-down box 312 in content pane 306. In response to the user selection, panel 340 is displayed in content pane 306. The user then selects, from a drop-down box in panel 340, the closing price as the metric with respect to which the trends of the "GOOG" stock instrument are going to be determined. The user then enters the duration parameter value "20" and the precision parameter value "0.50" through GUI components 342. In response to receiving the duration and/or the precision parameter from the user, the trending date set computer is applied to a time series that comprises the values of the closing price of "GOOG" stock instrument. The trending date set computer (or another software component) retrieves the "GOOG" closing price time series from a data repository. The time series is then plotted on the chart in content pane 308 as time series line 344.

Next, the user selects an above/below date set computer from drop-down box 312 in content pane 306. In response to the user selection, panel 332 is displayed in content pane 306. The user enters the "S&P" ticker as the market instrument to which an above/below date set computer is to be applied. The user may specify the "S&P" instrument by selecting from, or by typing in, a drop-down box in panel 332. The user then selects, from a drop-down box in panel 332, the closing price as the metric with respect to which the above/below market conditions of the "S&P" instrument is going to be determined. The user then enters the range of "at least 1,300" through GUI components 334. In response to receiving the range parameter from the user, the above/below date set computer is applied to a time series that comprises the values of the closing price of "S&P" instrument. The above/below date set computer (or another software component) retrieves the "S&P" closing price time series from a data repository. The time series is then plotted on the chart in content pane 308 as time series line 336.

According to the techniques described herein, based on the duration and precision values specified by the user, the trending date set computer associated with panel 340 computes the trend lines for the up-trends from the time series of the closing price of the "GOOG" stock instrument. As illustrated in FIG. 3B, the trending date set computer determines that there exist two up-trends satisfying the duration and precision values specified by the user, which trends are displayed on the chart in content pane 308 as trend lines 345. Similarly, the above/below date set computer determines the regions that satisfy the range parameter ("at least 1,300") specified by the user, which regions are displayed on the chart in content pane 308 as regions 337. In addition, the trending date set computer associated with panel 340 determines the date ranges during which the closing price of the "GOOG" stock instrument is trending up. Similarly, the above/below date set computer associated with panel 332 determines the date ranges during which the closing price of the "S&P" instrument is above 1,300.

The user then specifies, through drop-down box 330, that the time periods generated by the trending and above/below date set computers are to be conjunctively combined. In the example embodiment of FIG. 3B, the user may select the value "all" from drop-down box 330 in order to indicate the conjunctive combination. In response to the user selection, a software component associated with drop-down box 330 determines the intersection of the date ranges generated by the trending and above/below date set computers. The intersection of the time periods is then displayed in content pane 308 as shaded region 350. Region 350 represents the time periods during which the "GOOG" stock instrument is trending up and the "S&P index is above 1,300. As illustrated in content pane 308, the date set in which the closing price of the "GOOG" stock is trending up and the "S&P" index is above 1,300 may be, for example, Sep. 21, 2006 to Oct. 25, 2006.

According to the techniques described herein, the user may then adjust the parameter values specified in GUI components 342 (for the trending date set computer) and GUI components 334 (for the above/below date set computer) in order to determine the exact market conditions, related to the "GOOG" stock and the "S&P" index, which the user is interested in. In response, the trending and the above/below date set computers would re-compute their respective date ranges, and the result set of date ranges would be re-computed and re-displayed on the chart in content pane 308. Thereafter, in response to user input, the determined result set of date ranges, the trending and above/below date set computers, and/or the parameters thereof may be stored in a market theme. The market theme represents the market conditions that were specified by the user through the parameters of the trending and above/below date set computers with respect to the closing price of the "GOOG" stock and the "S&P" index.

VI. Example Implementation Hardware

Figure 4:
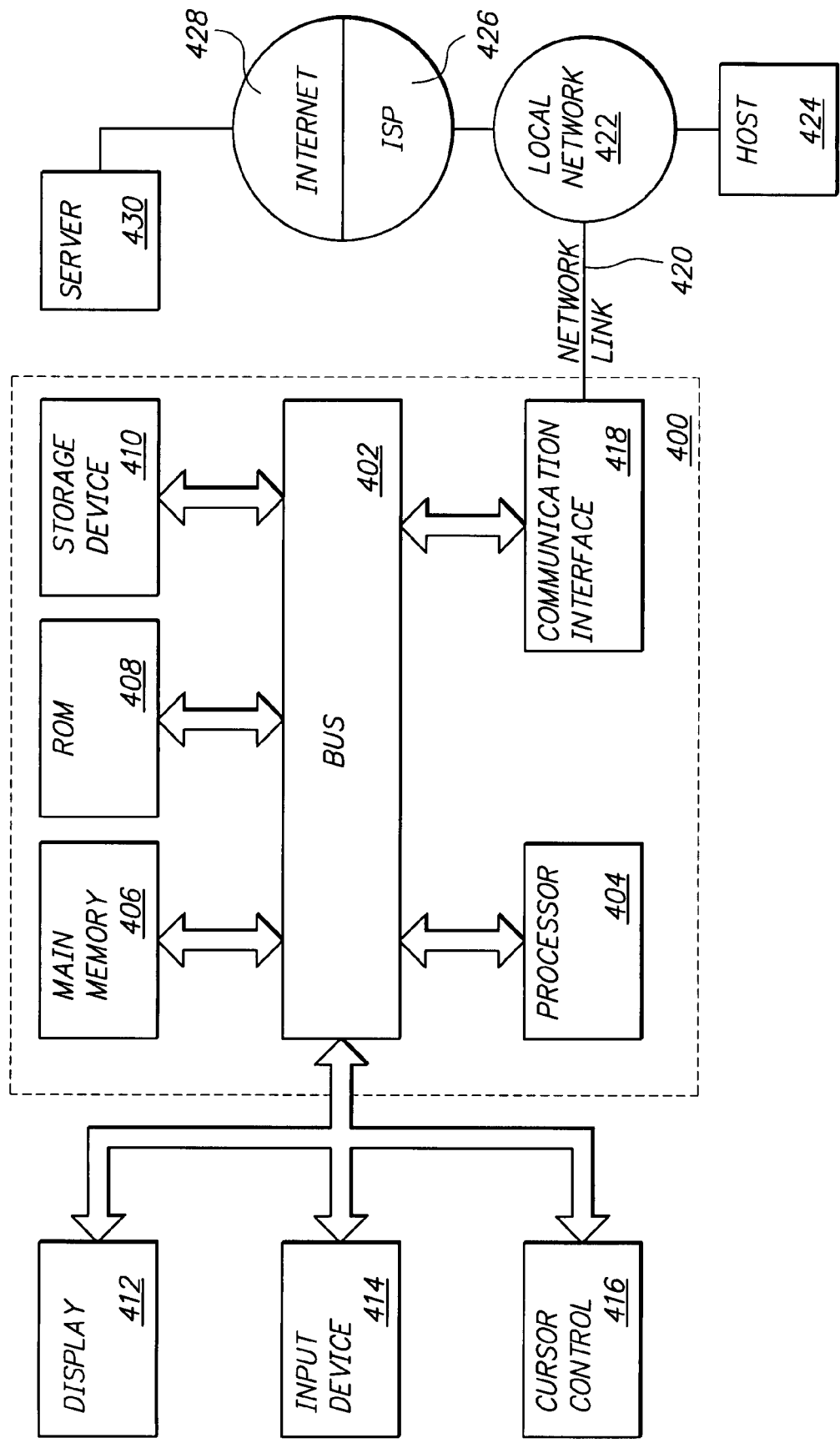
FIG. 4 illustrates a computer system with which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising steps of:
receiving first input that specifies a market instrument;

receiving second input that specifies one or more parameters for one or more date set computers that are associated with the market instrument;

receiving a first time series from a data repository, wherein the first time series is a sequence of data values associated with the market instrument;

determining a set of time periods, during which one or more market conditions existed for the market instrument, by applying the one or more date set computers based on the first time series and the one or more parameters, wherein when applied the one or more date set computers return the set of time periods, wherein the one or more parameters define the one or more market conditions which include one or more of: a trending condition which indicates that the first time series is trending up or down, an above/below condition which indicates that the first time series is above or below a certain threshold, and a peaks/troughs condition which indicates peaks or troughs in the first time series;

wherein each of the one or more date set computers comprises a set of instructions which, when executed by one or more processors, cause the one or more processors to examine the first time series and to determine one or more of the set of time periods during which the one or more market conditions existed for the market instrument;

wherein the set of time periods comprises:
  a set of date ranges, wherein each date range of the set of date ranges includes a start date and an end date; or
  a set of specific dates; and displaying a set of graphical representations that respectively correspond to the set of time periods overlaid on a graphical representation of the first time series in a graphical user interface, wherein the set of graphical representations indicate the set of time periods and the one or more market conditions which existed for the market instrument during the set of time periods;

wherein the steps of the method are performed by one or more computer systems.

2. The method of claim 1, wherein:
at least one parameter of the one or more parameters specifies a metric associated with the market instrument; and
prior to being received, the first time series is derived by determining the sequence of data values for the metric associated with the market instrument.

3. The method of claim 2, wherein the metric is any one of:
a closing price of the market instrument;
volatility of the market instrument; and
relative strength index (RSI) of the market instrument.

4. The method of claim 1, wherein:
the one or more date set computers are configured to identify time periods in which the first time series is trending; and
the one or more parameters include a duration value and a precision value that define trends associated with the market instrument.

5. The method of claim 1, wherein:
the one or more date set computers are configured to identify time periods in which the first time series is above or below the certain threshold; and
the one or more parameters include a range value and a metric for generating the first time series.

6. The method of claim 5, wherein the metric is any one of:
a relative strength index (RSI) metric;
a market capitalization metric;
a volume metric;
a historical volatility (HVol) metric; and
an implied volatility (IVol) metric.

7. The method of claim 1, wherein:
the one or more date set computers are configured to identify time periods in which the first time series is at a peak or trough; and
the one or more parameters include a value specifying the maximum duration of the peak or trough and one or more values specifying the minimum height of the peak or trough.

8. The method of claim 1, wherein:
the one or more date set computers include a first date set computer and a second date set computer; and
the one or more parameters specify a combination of the first date set computer and the second date set computer, wherein the combination defines how any time periods generated by the first date set computer are related to any time periods generated by the second date set computer.

9. The method of claim 8, wherein the combination is any one of a conjunctive combination and a disjunctive combination.

10. The method of claim 1, further comprising storing a market theme that comprises two or more of the date set computers used to generate the set of time periods and a combination function.

11. The method of claim 10, further comprising:
accessing a specific market theme that defines a time window over which correlation is to be performed;
determining the set of time periods within the time window by applying to the first time series the one or more date set computers stored in the market theme;
evaluating, over the set of time periods within the time window, a plurality of time series associated with a plurality of other market instruments; and
correlating the market instrument to one or more other market instruments, of the plurality of other market instruments, during the set of time periods within the time window.

12. The method of claim 10, further comprising:
accessing the market theme and retrieving the set of time periods; and
evaluating a trading strategy over the set of time periods to determine what result would have been obtained if the trading strategy were actually executed during the set of time periods, wherein the trading strategy involves one or more trading actions with respect to one or more market instruments.

13. The method of claim 10, further comprising:
accessing the market theme and retrieving the set of time periods; and
evaluating an aggregate statistic associated with a particular market instrument by analyzing a particular time series of the particular market instrument over the set of time periods.

14. The method of claim 10, further comprising:
receiving third input that specifies a set of market instruments;
accessing the market theme and retrieving the set of time periods; and
applying the set of time periods to a set of time series associated with the set of market instruments in order to determine how the set of market instruments would have performed during the set of time periods.

15. The method of claim 10, further comprising:
accessing the market theme and retrieving the set of time periods;
accessing a set of independent time series associated with one or more market instruments; and performing a regression analysis over values in the set of independent time series to model a dependent time series.

16. The method of claim 1, further comprising:
storing a market theme that comprises the one or more date set computers and the one or more parameters;
accessing the market theme and retrieving the one or more date set computers;
applying the one or more date set computers to current values for one or more metrics of a particular market instrument in order to determine whether a current time period is included in time periods that would be generated by applying the market theme for the particular market instrument; and
sending a notification when the current time period is included in the time periods for the particular market instrument.

17. A non-transitory machine-readable storage medium storing one or more program instructions that comprise instructions which, when executed by one or more processors, cause the one or more processors to perform steps comprising:
receiving first input that specifies a market instrument;
receiving second input that specifies one or more parameters for one or more date set computers that are associated with the market instrument;
receiving a first time series from a data repository, wherein the first time series is a sequence of data values associated with the market instrument;
determining a set of time periods, during which one or more market conditions existed for the market instrument, by applying the one or more date set computers based on the first time series and the one or more parameters, wherein when applied the one or more date set computers return the set of time periods, wherein the one or more parameters define the one or more market conditions which include one or more of: a trending condition which indicates that the first time series is trending up or down, an above/below condition which indicates that the first time series is above or below a certain threshold, and a peaks/troughs condition which indicates peaks or troughs in the first time series;
wherein each of the one or more date set computers comprises a set of instructions which, when executed by the one or more processors, cause the one or more processors to examine the first time series and to determine one or more of the set of time periods during which the one or more market conditions existed for the market instrument;
wherein the set of time periods comprises:
a set of date ranges, wherein each date range of the set of date ranges includes a start date and an end date; or
a set of specific dates; and
displaying a set of graphical representations that respectively correspond to the set of time periods overlaid on a graphical representation of the first time series in a graphical user interface, wherein the set of graphical representations indicate the set of time periods and the one or more market conditions which existed for the market instrument during the set of time periods.

18. The machine-readable medium of claim 17, wherein:
at least one parameter of the one or more parameters specifies a metric associated with the market instrument; and
prior to being received, the first time series is derived by determining the sequence of data values for the metric associated with the market instrument.

19. The machine-readable medium of claim 18, wherein the metric is any one of:
a closing price of the market instrument;
volatility of the market instrument; and
relative strength index (RSI) of the market instrument.

20. The machine-readable medium of claim 17, wherein:
the one or more date set computers are configured to identify time periods in which the first time series is trending; and
the one or more parameters include a duration value and a precision value that define trends associated with the market instrument.

21. The machine-readable medium of claim 17, wherein:
the one or more date set computers are configured to identify time periods in which the first time series is above or below the certain threshold; and
the one or more parameters include a range value and a metric for generating the first time series.

22. The machine-readable medium of claim 21, wherein the metric is any one of:
a relative strength index (RSI) metric;
a market capitalization metric;
a volume metric;
a historical volatility (HVol) metric; and
an implied volatility (IVol) metric.

23. The machine-readable medium of claim 17, wherein:
the one or more date set computers are configured to identify time periods in which the first time series is at a peak or trough; and
the one or more parameters include a value specifying the maximum duration of the peak or trough and one or more values specifying the minimum height of the peak or trough.

24. The machine-readable medium of claim 17, wherein:
the one or more date set computers include a first date set computer and a second date set computer; and
the one or more parameters specify a combination of the first date set computer and the second date set computer, wherein the combination defines how any time periods generated by the first date set computer are related to any time periods generated by the second date set computer.

25. The machine-readable medium of claim 24, wherein the combination is any one of a conjunctive combination and a disjunctive combination.

26. The machine-readable medium of claim 17, wherein the one or more program instructions further comprise instructions which, when executed by the one or more processors, cause storing a market theme that comprises two or more of the date set computers used to generate the set of time periods and a combination function.

27. The machine-readable medium of claim 26, wherein the one or more program instructions further comprise instructions which, when executed by the one or more processors, cause:
accessing a specific market theme that defines a time window over which correlation is to be performed;
determining the set of time periods within the time window by applying to the first time series the one or more date set computers stored in the market theme;
evaluating, over the set of time periods within the time window, a plurality of time series associated with a plurality of other market instruments; and
correlating the market instrument to one or more other market instruments, of the plurality of other market instruments, during the set of time periods within the time window.

28. The machine-readable medium of claim 26, wherein the one or more program instructions further comprise instructions which, when executed by the one or more processors, cause:
- accessing the market theme and retrieving the set of time periods; and
- evaluating a trading strategy over the set of time periods to determine what result would have been obtained if the trading strategy were actually executed during the set of time periods, wherein the trading strategy involves one or more trading actions with respect to one or more market instruments.

29. The machine-readable medium of claim 26, wherein the one or more program instructions further comprise instructions which, when executed by the one or more processors, cause:
- accessing the market theme and retrieving the set of time periods; and
- evaluating an aggregate statistic associated with a particular market instrument by analyzing a particular time series of the particular market instrument over the set of time periods.

30. The machine-readable medium of claim 26, wherein the one or more program instructions further comprise instructions which, when executed by the one or more processors, cause:
- receiving third input that specifies a set of market instruments;
- accessing the market theme and retrieving the set of time periods; and
- applying the set of time periods to a set of time series associated with the set of market instruments in order to determine how the set of market instruments would have performed during the set of time periods.

31. The machine-readable medium of claim 26, wherein the one or more program instructions further comprise instructions which, when executed by the one or more processors, cause:
- accessing the market theme and retrieving the set of time periods;
- accessing a set of independent time series associated with one or more market instruments; and
- performing a regression analysis over values in the set of independent time series to model a dependent time series.

32. The machine-readable medium of claim 17, wherein the one or more program instructions further comprise instructions which, when executed by the one or more processors, cause:
- storing a market theme that comprises the one or more date set computers and the one or more parameters;
- accessing the market theme and retrieving the one or more date set computers;
- applying the one or more date set computers to current values for one or more metrics of a particular market instrument in order to determine whether a current time period is included in time periods that would be generated by applying the market theme for the particular market instrument; and
- sending a notification when the current time period is included in the time periods for the particular market instrument.

* * * * *